April 8, 1952     H. D. WILSON ET AL     2,591,754
BATTERY SEPARATOR
Filed May 21, 1945
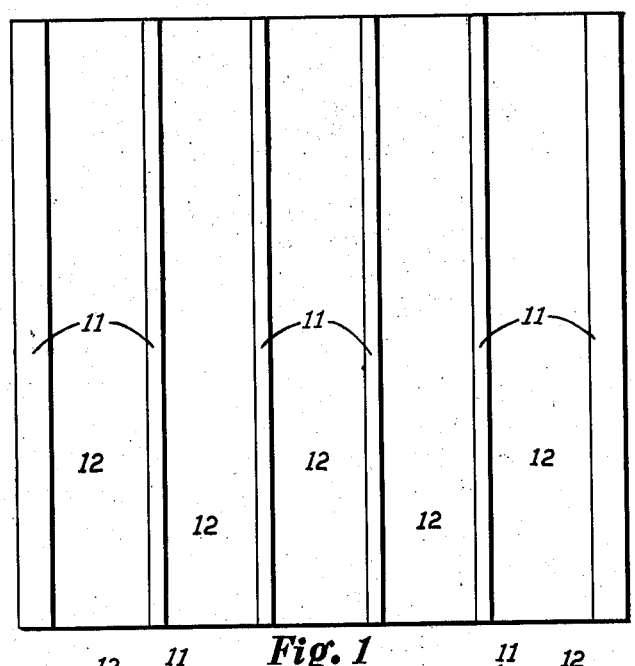
Fig. 1
Fig. 2
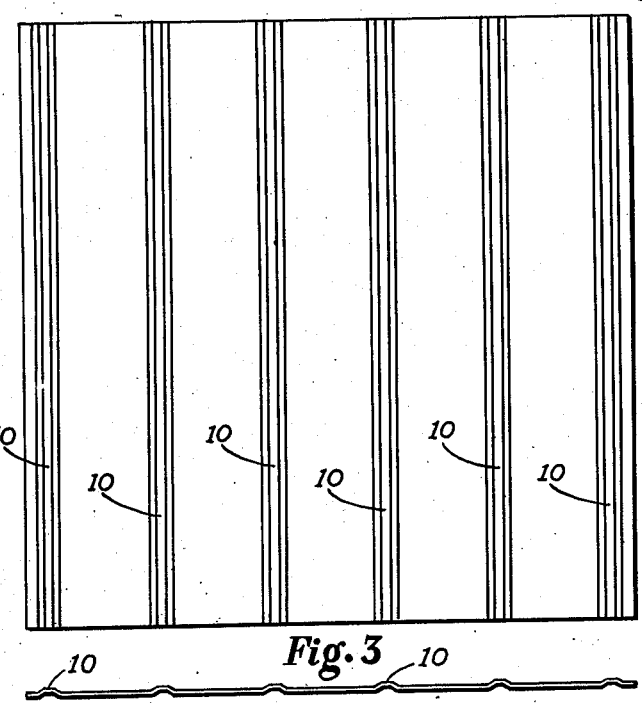
Fig. 3
Fig. 4
INVENTORS
HARLAND D. WILSON &
JEAN H. QUICK
BY
ATTORNEYS.

Patented Apr. 8, 1952

2,591,754

UNITED STATES PATENT OFFICE 2,591,754

BATTERY SEPARATOR

Harland D. Wilson, Toledo, Ohio, and Jean H. Quick, Indianapolis, Ind., assignors to Auto-Lite Battery Corporation, Niagara Falls, N. Y., a corporation of New York Application May 21, 1945, Serial No. 594,922

2 Claims. (Cl. 136—146)

This invention relates to synthetic battery separators, more particularly to separators made of natural fibers bonded together with polymerized synthetic resin.

The invention contemplates the provision of a synthetic separator which is durable and which is cheap to manufacture, being fabricated of raw materials readily available on the market in uniform and purified form. The separator contemplated has particular utility in a charged and dry storage battery, where the battery, in dry, sealed condition, is shipped separately from the electrolyte, which is added to the battery at the point of destination to place the battery in operative form. In this application the utilization of a chemical wetting agent is contemplated in the separator, applied either to the separator directly, and thereafter dried, or added as a component part of the electrolyte at the point of destination.

It is, therefore, a principal object of this invention to provide a synthetic separator for use in a lead-acid type of storage battery.

It is a further object of this invention to provide for use in a storage battery of the lead-acid type a synthetic separator which is made of natural fibers bonded together.

It is a further object of this invention to provide for storage batteries of the lead-acid type a synthetic separator which is treated with a chemical wetting agent.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Fig. 1 is an elevational view of one form of the separator.

Fig. 2 is a plan view of the separator shown in Fig. 1.

Fig. 3 is an elevational view of another form of the separator, and

Fig. 4 is a plan view of the separator shown in Fig. 3.

The synthetic separator for lead-acid types of storage batteries contemplated in this invention may be made of natural fibers bonded together by a resin, or by synthetic fibers either bonded together by a resin or by being self-bonded. In the preferred modification of the invention the separator is fabricated of purified cellulose fibers obtained from wood, such as alpha pulp and/or bleached kraft pulp from western hemlock, which may be formed as a thin sheet in a paper-making machine with a predetermined density and porosity. Inasmuch as density largely controls porosity, it has been found that a density from 6.5 to 9.5 grams per cubic inch is satisfactory.

When the fibers are formed in the thin sheet having the desired density and porosity, the sheet is impregnated with a resin capable of permanently bonding the fibers together to form a durable material which will have the necessary physical and chemical properties to fulfill its function as a battery separator. The resin preferred for this purpose is a water-dispersed thermosetting phenol-formaldehyde resin although a thermoplastic resin may also be used. The amount of resin used may vary widely from 15 to 65 per cent by weight of the completed dry separator, the preferred amount being 30 to 40 per cent of said weight of the dry separator. After impregnation, the sheet is dried to remove all but a few percent of the water (or other solvent or carrier) and to prepare the resin bond in the sheet for polymerization.

The moistened sheet is placed in a temperature of 325–375 deg. F. for a period of time suitable to evaporate the water and polymerize or thermoset the resin. The curing of the sheet material impregnated with the resin renders the sheet relatively rigid, and gives it permanent form. The separator may be given other physical forms, after the curing step, by high speed grinding, or the like, so that ribs 11, as shown in the separator illustrated in Figs. 1 and 2, may be formed by cutting grooves 12 in one face of appropriately thick sheet stock, previously cured at 325–375 deg. F. The grinding reduces the thickness of the sheet in the groove 12, leaving the ribs 11, the original thickness of the sheet.

If desired, the thin sheet of matted fibers impregnated with the uncured or unpolymerized resin may be given a physical form such as illustrated in Figs. 3 and 4 where portions 10 are embossed by rollers, as is well known in the art, to simulate longitudinal ribs, or any other embossed pattern suitable for the purpose of facilitating circulation of the electrolyte in and escape of gases from the completed battery in which the separator is used. Prior to embossing, the sheets of fiber are sprayed with water so that the moisture content is brought up from about five per cent to about 17 per cent, based on dry weight. The water preferably is allowed to soak into the sheet fibers for a period of 12 to 16 hours, during which time the water wets and is absorbed by the fibers so that during the embossing operation the fibers are lubricatetd by the water and slide over one another so that the sheet does not tear or break. After embossing, the sheets are ready for curing as described hereinafter.

The cured separators do not have a strong affinity for water so that when they are used in a battery the separators do not absorb the electrolyte quickly, due probably to the air in the pores of the separator, and to the liquid-repelling properties of the resin. This is particularly true when these separators are used in charged and dry batteries. When the electrolyte is added to the battery under these circumstances, the electrolyte is not absorbed to a sufficient degree for efficient initial operation of the battery. The separators are treated with a chemical wetting agent, preferably an organic chemical compound, to obviate this difficulty, with the result that the separators are more completed saturated with the electrolyte to reduce the internal resistance of the battery to a minimum so that most efficient operation of the battery is obtained. The wetting agent is innocuous as far as the chemical action of the battery is concerned and does not affect the normal operating cycle of the storage battery.

Many wetting agents are known and are commercially available but dioctyl sodium sulfosuccinate is preferred, being preferably introduced into the separator in a water solution. Another suitable wetting agent is a sulfonated ester of dicarboxylic acid. However, it may also be introduced by an organic solvent, such as benzene or alcohol, in which this wetting agent is soluble. It may also be introduced by a liquid medium as a colloidal dispersion of the wetting agent. The liquid medium is then removed by evaporation, depositing the wetting agent on the fibers of the separator. The strength of the preferred water solution of the wetting agent is ¼ to 3 per cent by weight. When the electrolyte is added to a charged and dry battery, the wetting agent, being present in the separator, will cause a rapid dispersion of the electrolyte through the separator whereby the internal resistance of the battery is reduced to a minimum to assure efficient operation of the battery.

Instead of impregnating the sheet with phenolic resin, drying the sheet, curing the resin and applying a water solution of wetting agent to the cured sheet as a second step, it has been found possible to combine the water dispersed resin and the wetting agent so that one saturation of the sheet and one drying and curing operation serves to polymerize the resin and impregnate the sheet with the wetting agent so that the separators made from the sheet are promptly wetted with sulfuric acid electrolyte when it is added to a charged and dry battery.

The wetting agent may also be added to the battery cell in other ways to facilitate the saturation of these separators by the electrolyte, as set forth in the above disclosure as, for example, by mixing it with the electrolyte added to a charged and dry battery, the amount added to the electrolyte being in approximately the same proportion as set forth above. When the wetting agent is added in this manner, obviously the step in which the separator is treated with the wetting agent is omitted.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

What is claimed:

1. The method of producing a synthetic separator for a battery including spaced plates and an acid electrolyte, comprising forming a thin sheet of matted cellulose fibers, such as obtained from wood, of suitable thickness to fit between the spaced plates of the battery, said sheet having a density not greater than 9.5 grams per cubic inch, impregnating the thin sheet with a water-dispersed phenol-formaldehyde resin to incorporate into the sheet from 15 to 65 per cent resin based on the weight of the dry separator, said water-disposed resin solution containing up to 3% by weight of a wetting agent innocuous to the chemical action of the battery, applying heat to remove the water partially from the impregnated sheet to not more than 17% retained moisture to deposit the resin on the fibers including a coating of the wetting agent, forming the sheet, and thereafter polymerizing the resin by application of heat to its stable condition.

2. In a dry synthetic separator for a battery including spaced plates and an acid electrolyte, a thin sheet of matted cellulose fibers such as obtained from wood of suitable thickness for positioning between the spaced plates of the battery, said sheet having a fiber density not greater than 9.5 grams per cubic inch, a thermosetting resin bonding said fibers together into a relatively rigid sheet capable of maintaining its form in the battery under vibration during use, said resin ranging from 15 to 65 per cent of the weight of the dry separator, without destroying the porosity of the sheet to allow rapid dispersion of the electrolyte therethrough for the electrochemical action of the battery and a coating of a wetting agent on the fibers of the sheet which is innocuous to the chemical action of the battery to facilitate the dispersion of the electrolyte through the sheet when placed in dry condition in a battery.

HARLAND D. WILSON.
JEAN H. QUICK.

REFERENCES CITED

The following references are of record in the file of this patent:

UNITED STATES PATENTS

| Number | Name | Date |
|---|---|---|
| 1,366,223 | Wales | Jan. 18, 1921 |
| 1,432,938 | Wood et al. | Oct. 24, 1922 |
| 1,512,485 | Pouchain | Oct. 21, 1924 |
| 1,836,021 | Gibbons | Dec. 15, 1931 |
| 1,846,090 | De Loye et al. | Feb. 23, 1932 |
| 1,899,535 | Teague | Feb. 28, 1933 |
| 2,016,162 | Wilderman | Oct. 1, 1935 |

(Other references on following page)

| Number | Name | Date |
|---|---|---|
| 2,043,954 | Kershaw | June 9, 1936 |
| 2,084,272 | Auchterlonie | June 15, 1937 |
| 2,090,758 | Hoflin | Aug. 24, 1937 |
| 2,103,640 | Richter | Dec. 28, 1937 |
| 2,155,016 | Kershaw | Apr. 18, 1939 |
| 2,175,798 | Hauser | Oct. 10, 1939 |
| 2,181,891 | Hazell | Dec. 5, 1939 |
| 2,231,836 | Zerweck et al. | Feb. 11, 1941 |
| 2,291,079 | Hofferbert | July 28, 1942 |
| 2,291,080 | Hofferbert | July 28, 1942 |
| 2,292,118 | Guhl | Aug. 4, 1942 |
| 2,297,248 | Rudolph | Sept. 29, 1942 |
| 2,314,203 | Fairclough | Mar. 16, 1943 |
| 2,383,283 | Auxier | Aug. 21, 1945 |
| 2,437,082 | Davis et al. | Mar. 2, 1948 |

FOREIGN PATENTS

| Number | Country | Date |
|---|---|---|
| 327,131 | Great Britain | Mar. 25, 1930 |
| 476,207 | Great Britain | Dec. 3, 1937 |
| 534,618 | Great Britain | Mar. 12, 1941 |

OTHER REFERENCES

Bakelite Review, October 1941, pages 14 and 15.